P. RAYSON.
AUXILIARY PNEUMATIC SUPPORT FOR VEHICLES.
APPLICATION FILED AUG. 13, 1913.
1,111,675.
Patented Sept. 22, 1914.
2 SHEETS—SHEET 1.
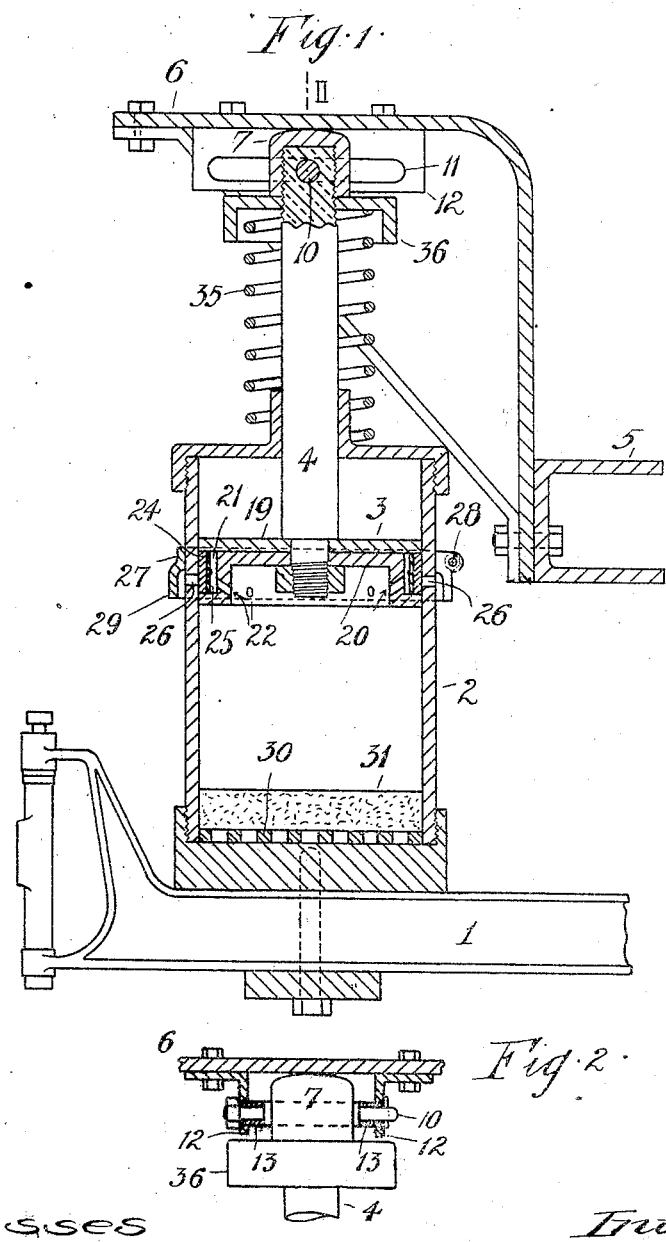
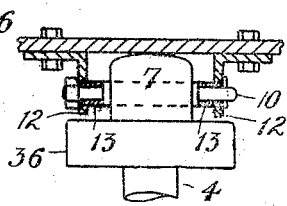

P. RAYSON.
AUXILIARY PNEUMATIC SUPPORT FOR VEHICLES.
APPLICATION FILED AUG. 13, 1913.

1,111,675.

Patented Sept. 22, 1914.
2 SHEETS—SHEET 2.

Witnesses:
M. E. McNabb

Inventor
Philip Rayson
by
James L. Norris
Attorney.

UNITED STATES PATENT OFFICE.

PHILIP RAYSON, OF ELSTERNWICK, VICTORIA, AUSTRALIA.

AUXILIARY PNEUMATIC SUPPORT FOR VEHICLES.

1,111,675.  Specification of Letters Patent. Patented Sept. 22, 1914.

Application filed August 13, 1913. Serial No. 784,639.

*To all whom it may concern:*

Be it known that I, PHILIP RAYSON, a subject of the King of Great Britain, residing at 142 Cochrane street, Elsternwick, in the State of Victoria, Commonwealth of Australia, engineer, have invented certain new and useful Improvements in Auxiliary Pneumatic Supports for Vehicles, of which the following is a specification.

This invention consists of an improved auxiliary pneumatic support for motor cars and like vehicles arranged between the axle and chassis thereof, the use of which will lessen road shocks and render pneumatic tires unnecessary.

Figure 3:
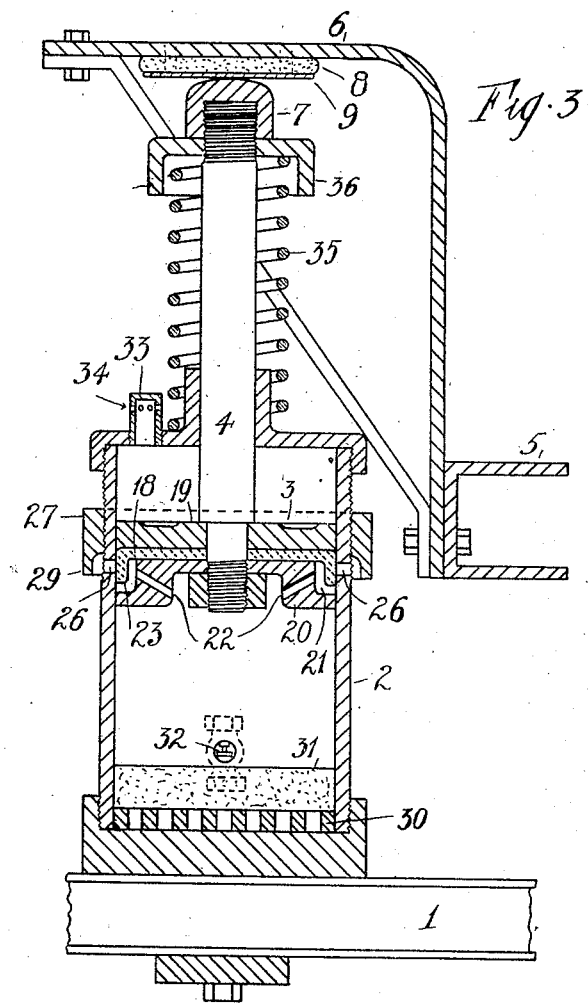
Figure 4:
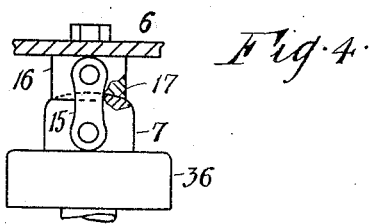

The invention is illustrated by the accompanying drawings whereof,

Figure 1 is a vertical section through one embodiment of the invention as applied to a motor car and Fig. 2 a section at right angles on line 11 thereof. Fig. 3 is a similar view to Fig. 1 illustrating a modification of construction. Fig. 4 illustrates a variation of construction of part of Fig. 1.

According to the preferred embodiment of this invention there is mounted upon the axles 1 (which expression shall be deemed to include any rigid projections from or connections with one or both axles) one or more cylinders 2 with air supply ports 26, each containing a piston or plunger 3, the upwardly extending stem 4 of which bears against the chassis or frame 5 of the vehicle if sufficient room is available or against a bracket 6 formed or bolted to said chassis or frame. With this construction, when the vehicle receives a road shock the piston plunger operates to compress the air in the cylinder whereby the shock is absorbed by the resultant pneumatic cushioning effect as with pneumatic tires. It will be evident that the same result would be obtained if the supports were inverted, *i. e.*, with the cylinders fixed to the chassis or to brackets attached thereto and the piston stems bearing against the axles or brackets thereon.

According to the construction illustrated the piston stem 4 is provided at its outer end with a hardened cap 7 having a rounded surface that bears against the bracket 6 and the bearing surface of the latter may have a rubber or like resilient pad 8 protected by a metal face plate 9 as in Fig. 3. The piston stem may be independent of the bracket or chassis as in Fig. 3 or attached thereto by a suitable connection to prevent the piston being interfered with when the chassis sways.

Figs. 1 and 2 illustrate one suitable form of connection which consists of a lateral pin 10 projecting through the piston stem and cap and extending through slots 11 formed in lugs 12 bolted to the bracket or chassis on either side of the stem. Said pin 10 is preferably provided with sleeve rollers 13 or other friction reducing bearings to facilitate its movements in the slot.

Another form of connection is illustrated in Fig. 4 and consists of links 15 on opposite sides of the cap 7 which connect the cap to a block 16 on said bracket or chassis, said block having its underside concaved as at 17 to conform to the bearing surface of the cap. The piston head or plunger may consist of a cup leather 18 (Fig. 3) clamped between two plates 19, 20, the lower one 20 being formed with a peripheral recess 21 (or series of recesses) which is in communication with the air in the cylinder beneath the head by means of passages 22 formed in said plate 20. By this construction when the air in the cylinder is compressed the pressure is imparted to the flange 23 of the cup leather and the latter pressed against the side of the cylinder so that an air tight fit is insured. In lieu of the cup leather a soft metal ring 24 having a thin leather cover 25 may be employed as in Fig. 1. Air is admitted to the cylinder through one or more inlet ports 26 formed in the side thereof and in such a position that air is admitted on the backward stroke of the piston. The air ports may be regulated by an adjustable band 27, either screwed on to the cylinder as in Fig. 3 or clamped in position by a bolt 28 as in Fig. 1. The band is preferably provided with a downwardly extending lip 29 to protect the ports 26 and minimize the ingress of dust or mud into the cylinders. Upon the bottom of the cylinder is seated a perforated metal disk plate or grid 30 upon which is placed a rubber disk 31. With this construction a better cushioning effect is obtained when the air is compressed in the cylinder while the metal plate permits the rubber to be squeezed into the perforations under exceptional air pressure in the cylinder.

In order to prevent a partial vacuum being formed in the cylinder either below or above the piston which would retard the movement of the piston the cylinder is provided near the bottom with a check valve 32 to admit air only into said cylindeer while an air relief cap 33 formed with apertures 34 is provided about the top of the cylinder.

A spring 35 is preferably employed to support the piston and assist in returning it to normal position and said spring may be placed around the stem and bear against the top of the cylinder and against a flanged collar 36 on said stem.

The number of these auxiliary pneumatic supports used on a motor car or other vehicles, will be determined by the weight thereof and they are preferably placed near the ends of the axles between the usual main supporting springs and the wheels.

I claim:

1. An improved auxiliary pneumatic support for vehicles consisting of a cylinder mounted on the axle of the vehicle, a piston in said cylinder provided with a projecting stem, a hardened cap on the end of the latter, and a rubber pad covered by a metal plate on the chassis against which said cap bears.

2. An improved auxiliary pneumatic support for vehicles consisting of a cylinder mounted on the axle of the vehicle, a piston in said cylinder provided with a projecting stem adapted to bear against the chassis, a pair of lugs on the latter formed with slots and a laterally projecting pin on the stem provided with friction reducing bearings and engaging said slots.

3. An improved auxiliary pneumatic support for vehicles consisting of a cylinder provided with air ports and mounted on the axle of the vehicle, a perforated metal plate in the bottom of said cylinder, a rubber disk upon said plate, a piston in said cylinder provided with a projecting stem adapted to bear against the chassis or a bracket thereon.

4. An improved auxiliary pneumatic support for vehicles consisting of a cylinder provided with air ports and mounted on the axle of the vehicle, a piston in said cylinder comprising a pair of plates and a cup leather clamped between said plates, the lower plate being formed with a peripheral recess and with passages extending between said recess and its under face and a projecting stem on said piston adapted to bear against the chassis or a bracket thereon.

5. An improved auxiliary pneumatic support for vehicles consisting of a cylinder vided with air ports and an adjustable band formed with a lip to overlie said air port, and a piston in said cylinder provided with a projecting stem adapted to bear against the chassis or a bracket thereon.

6. An improved auxiliary pneumatic support for vehicles consisting of a cylinder provided with air ports mounted on the axle of the vehicle, a piston in said cylinder including a pair of plates and a yieldable annular part which is held between the plates and contacts with the wall of the cylinder, the lower plate being formed with a peripheral recess in which said part fits and with passages extending between said recess and its under face, and a projecting stem on said piston adapted to bear against the chassis or a bracket thereon.

In testimony whereof I have hereunto set my hand in presence of two subscribing witnesses.

PHILIP RAYSON.

Witnesses:
 EDWARD N. WATERS,
 WILLIAM H. WATERS.